Patented Aug. 12, 1947

2,425,530

UNITED STATES PATENT OFFICE 2,425,530

INSECTICIDE

Edward Harvill, Yonkers, N. Y., assignor to Boyce Thompson Institute for Plant Research, Inc., a corporation of New York No Drawing. Application December 26, 1942,
Serial No. 470,224

2 Claims. (Cl. 167—24)

This invention relates to insecticides for combating insect pests, such as flies, moths, aphids, bean beetles and the like, and has for its object the provision of an improved insecticidal composition.

I have found that the alkaloid piperine, which is extractable from black pepper, is extremely toxic to insects and may be used with exceptional killing efficiency, especially when in combinations with pyrethrins. This toxic constituent of black pepper may conveniently be recovered by extraction with such organic solvents, as ether, acetone, chloroform or alcohol, for use as an insecticide in my invention. My invention provides an insecticidal composition comprising an extract of black pepper and pyrethrin extracts or dusts.

Insecticidal compositions containing pyrethrin are widely used in combating insect pests. The pyrethrins are usually dissolved in a solvent base of the hydrocarbon or mineral oil type, such as kerosene, naphtha, etc. The pyrethrins produce a rapid paralyzing action which wears off gradually and the killing effect is not effective. Insecticidal compositions containing pyrethrins have produced good results in combating household flies and the like but many of these compositions are prohibitively costly in view of the relatively large amount of expensive pyrethrin required.

The extracts of black pepper may be used in various solvent or carrier bases of the hydrocarbon or mineral oil types, either alone or in compositions, including pyrethrins. Petroleum sprays of the invention comprising black pepper extracts and only relatively small amounts of pyrethrins give unusual results in both the percent of "knockdown" and the percent of "kill," of common flies.

The effectiveness of black pepper extracts as insecticides is illustrated by the following tests determined by the Standard Peet-Grady method with five-day old flies, as described on pages 92 to 98 of "Pyrethrum Flowers," by C. B. Gnadinger, 1936 edition:

| Example No. | Conc. Pyrethrins, g./100 cc. | Purified Conc. Alcoholic Extract of Black Pepper, g./100 cc. | No. Flies | Per cent Knockdown | Per cent Kill |
|---|---|---|---|---|---|
| A | 0.10 | | 1,096 | 100 | 59.9 |
| 1 | 0.10 | 0.20 | 464 | 99.8 | 99.8 |
| 2 | 0.05 | 0.20 | 485 | 99.8 | 98.0 |
| 3 | 0.05 | 0.05 | 403 | 100 | 92.0 |
| 4 | 0.03 | 0.05 | 413 | 100 | 92.2 |

The foregoing examples illustrate the knockdown power of pyrethrins and the relatively ineffective killing power at the concentrations used. They also illustrate the effective knockdown and killing power of compositions containing very small quantities of both pyrethrin and pepper extract. It is apparent that a composition of the two substances in a single spray gives a rapid paralyzing action as shown by the percent of knockdown and great toxicity as shown by the percent of kill.

I claim:

1. A contact insecticidal composition comprising piperine and pyrethrin in a liquid spray base of petroleum origin.

2. A contact insecticidal composition comprising piperine extracted from black pepper and pyrethrin in a liquid spray base of petroleum origin.

EDWARD HARVILL.

REFERENCES CITED

The following references are of record in the file of this patent:

UNITED STATES PATENTS

| Number | Name | Date |
|---|---|---|
| 593,990 | Deming | Nov. 23, 1897 |
| 2,285,950 | Sullivan | June 9, 1942 |
| 2,326,350 | Gertlen | Aug. 10, 1943 |

OTHER REFERENCES

McIndoo, U. S. D. A. Bulletin No. 1201, March 19, 1924, page 46.